Jan. 1, 1929.
D. T. BLACKMON
1,697,708
TIRE HANDLING MACHINE
Filed July 9, 1927   3 Sheets-Sheet 1
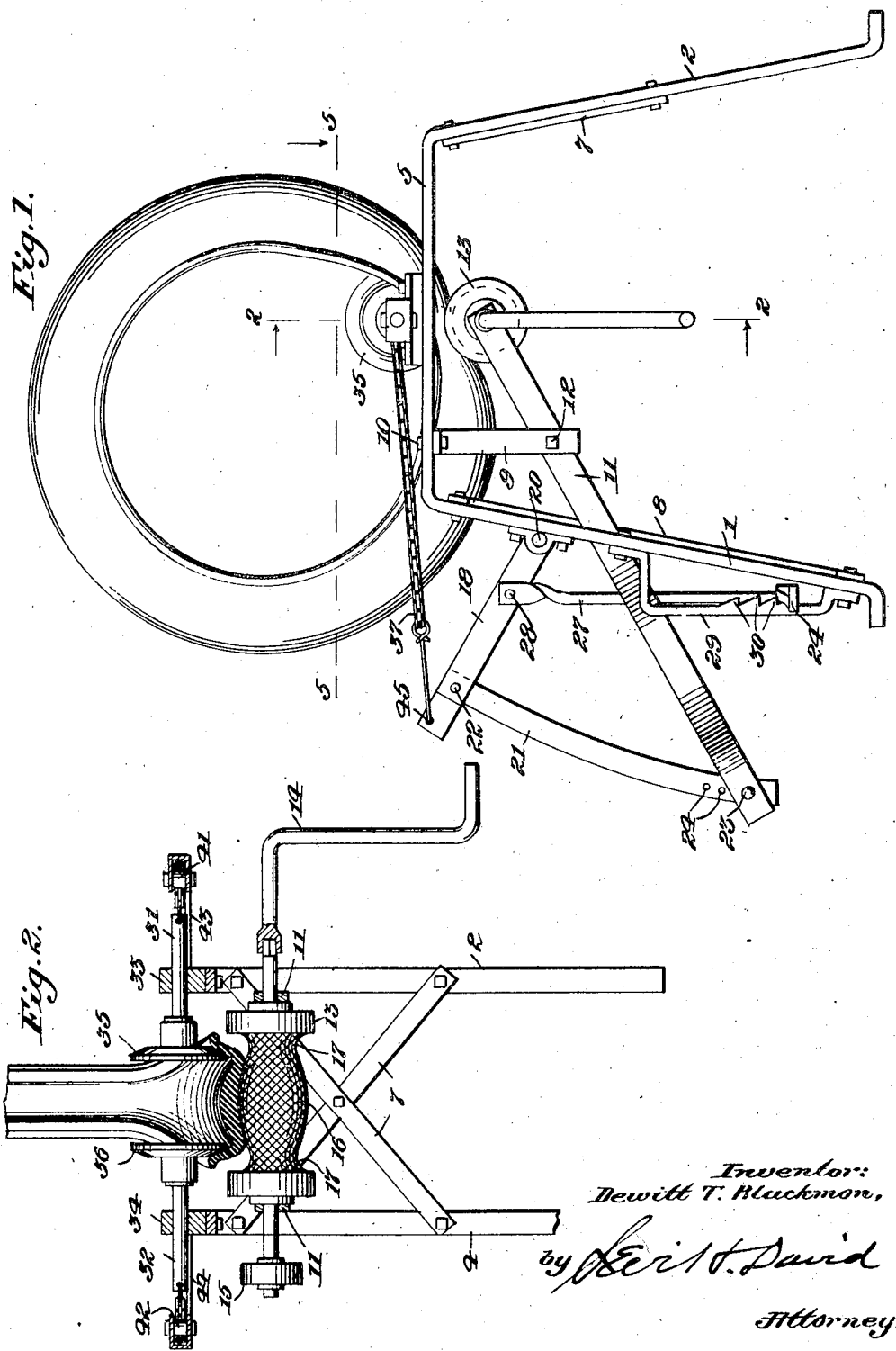
Inventor:
Dewitt T. Blackmon,
by [signature]
Attorney.

Jan. 1, 1929.
D. T. BLACKMON
TIRE HANDLING MACHINE
Filed July 9, 1927
1,697,708
3 Sheets-Sheet 2
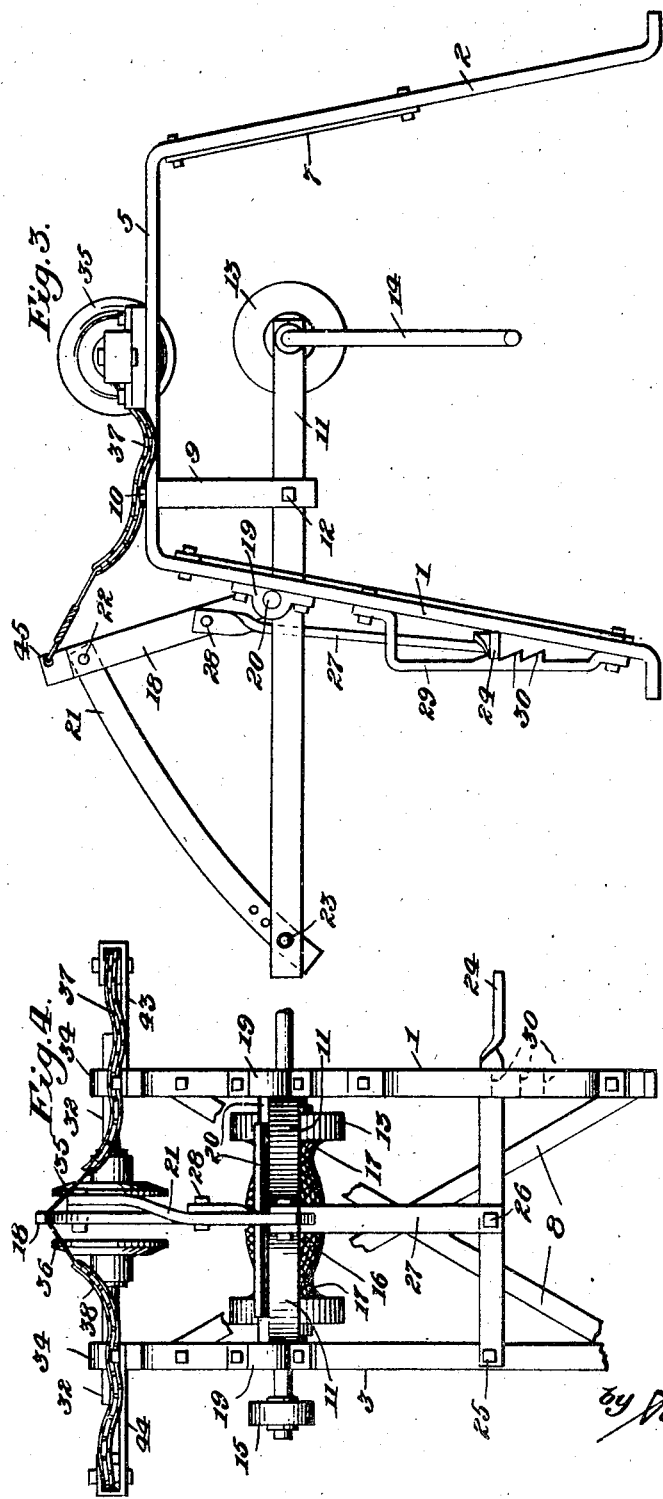
Inventor:
Dewitt T. Blackmon,
by
Attorney.

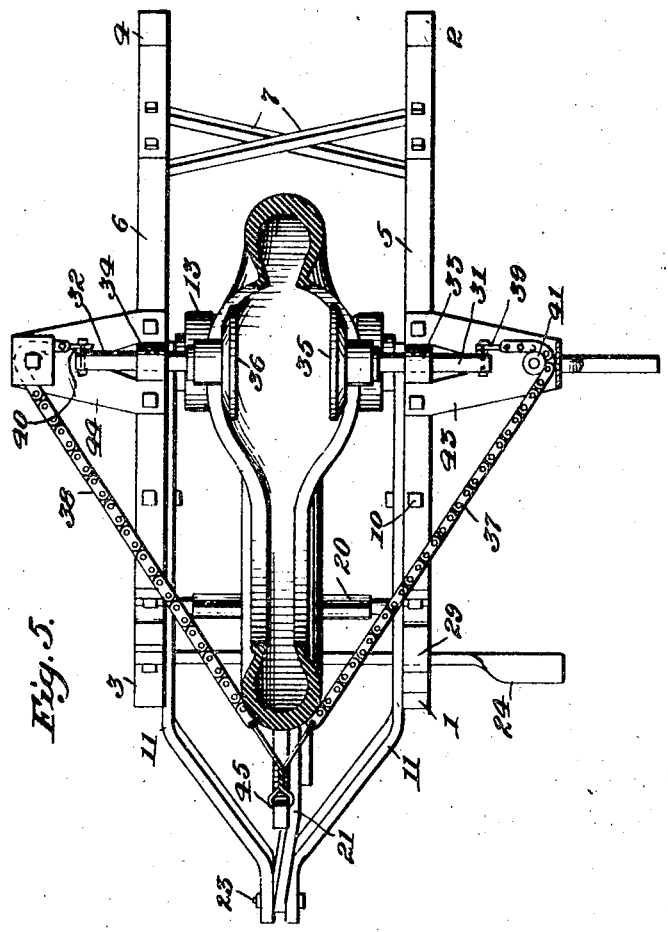

Patented Jan. 1, 1929.

1,697,708

UNITED STATES PATENT OFFICE.

DEWITT T. BLACKMON, OF COLUMBIA, SOUTH CAROLINA.

TIRE-HANDLING MACHINE.

Application filed July 9, 1927. Serial No. 204,571. REISSUED

An object of the invention is the provision of a machine for spreading the beads of pneumatic-tire casings such as are now commonly in use, for the purpose of inspection of, or treatment of, the inside of such casing, or for the purpose of assembling a tire tube and casing, as well as for other purposes.

Another object of the invention is the provision of means for supporting and rotating a tire casing for similar purposes.

Another object of the invention is the provision of and means for simultaneously spreading and rotating such tire casing whereby the inspection or treatment or assemblage may be continuous.

Another object of the invention is the provision of means for simultaneously spreading and rotating the tire casing with the elimination of any member or members which might interfere with or prevent the ready and continuous insertion of a tube within such casing.

Other objects will be apparent from the appended specification.

Referring to the drawings:

Fig. 1 is a side elevation of my improved machine, showing it in position to operate on a tire casing mounted thereon.

Fig. 2 is a section along the line 2—2 of Fig. 1, looking in the direction of the arrows.

Fig. 3 is a view similar to Fig. 1, showing the device in position to receive a casing.

Fig. 4 is an elevation of the left hand end of Fig. 3.

Fig. 5 is a top plan view showing the tire casing in section, taken along the line 5—5 of Fig. 1.

My improved machine comprises a suitable supporting device, such for example as a frame having supporting legs 1, 2, 3, 4, which support and are braced by horizontal supporting members 5, 6. Suitable cross braces 7, 8 may be provided, if desired, to add strength and rigidity to the support. A supporting member 9 is mounted on each member 5, 6, and each is securely held in position thereon by any suitable means such as a bolt 10, the two supporting means 9 thus being spaced apart substantially the same distance as the members 5, 6. Rotatably bolted to each of the arms 9 is a lever arm 11, as at 12, these arms 11 converging together at the front of the machine, that is at the left end of Fig. 1 or of Fig. 3. The arms 11 project on both sides of the pivot 12, and adjacent the inner ends thereof is mounted a roller 13, for either manual rotation as by a crank 14 which may be removable, or for automatic rotation by a pulley 15. The surface of the roller 13 is coarsely knurled or otherwise suitably roughened to cause it to rotate the casing; and this roller is shaped to have a greater diameter at its center 16 than adjacent its ends 17 for the purpose of aiding to spread the tire and present the inner surface thereof for examination or treatment, and for causing suitable flattening of the casing. A T-shaped bar having a leg 18 is mounted in bearings 19 suitably supported on the frame-work, the round ends 20 of the arms of such T-shaped member being accommodated in said bearings. An arm 21 is connected to the leg 18 at 22 for slight pivotal movement with respect thereto, and this arm 21 is also connected to the converged outer ends of the arms 11, and it is suitably attached thereto for slight pivotal movement with respect thereto as by a loose bolt 23. Some movement of the arm 21 angularly with respect to the members 18 and 11 may be necessary due to the relative positioning of the pivot points 12, 20, 22, and 23, and if adjustment of the length of the arm 21 should be necessary such arm may be provided with a series of spaced holes 24 for the accommodation of the pivot bolt 23.

A foot lever 24 is suitably pivoted to the frame-work as at 25, and pivoted to such foot lever at 26 is the lever 27, this lever 27 being in turn pivoted to the lever 21 at 28. A means 29 is provided for retaining the foot lever in lowered position, and this may comprise teeth 30 under which the foot lever may be inserted and from which it may be released by slight sidewise movement.

Rods 31, 32 are mounted for longitudinal movement in the respective supports 33, 34 on the frame parts 5, 6, and on the inner ends thereof the spreading disks 35, 36, preferably beveled as shown on Fig. 2, are so mounted that they will rotate on the rods 31, 32 without moving longitudinally thereof. A flexible connecting means 37, 38 is suitably connected to the outer ends of the rods 31, 32 respectively as at 39, 40, and each such flexible connecting means passes around a rotating member 41, 42 respectively mounted on supports 43, 44 on the frame-work. These flexible means, after passing around such rotating means, converge toward each other and are suitably connected as at 45 to the arm 18 of the T-shaped member previously described.

The operation of the device is as follows: The foot lever 24 being in the upper or inoperative position as shown in Fig. 3, the roller 13 will be in lowered position and the flexible members 37, 38 will be loose. A tire casing is then placed upon the roller 13 and is leaned toward the front or left hand end of the machine (as shown on the same figure). The spreading disks 35, 36 being positioned adjacent each other centrally of the machine will then stand over the longitudinal opening along the inner periphery of the tire. The foot lever 24 is then depressed, thus causing the roller 13 to rise up against the outer side of the tire as shown on Figs. 1 and 2; and such movement of the foot lever pulls the flexible members 37, 38 which in turn cause the spreading disks 35, 36 to separate from each other to the positions shown on Figs. 2 and 5. The movement of the inner edges of the tire opening which is along the inner periphery of the tire, to enclose the disks 35, 36, may if necessary be aided by the hand of the operator, or the disks 35, 36 may originally be placed in such close juxtaposition that they will be between the planes of the walls of the opening, and the beginning of movement of separation of these disks may be timed to begin after the edges of the disk are well within the tire opening by suitable adjustment of the length of the members 37, 38.

On completion of the downward movement of the foot lever 24 the tire casing will be in the position shown on Figs. 1, 2 and 5 and it may find some support, depending on its size, by contacting with the converging ends of the flexible members which may have smooth surfaces at the points of contact.

The roller 13 is then rotated either by means of the crank 14 or the pulley 15, and this causes rotation of the tire casing which in turn causes rotation of the disks 35, 36. As the casing rotates it is spread continuously and progressively and laid in a somewhat flat position by the disks and roller, and it may then easily be inspected or treated in any desired manner. Furthermore, a tire tube may easily be inserted into the casing progressively at this point as the casing rotates in very little time, there being no members or parts of the machine passing through the central plane of the casing and through and across the casing itself to interfere therewith.

When the downward movement of the foot lever 24 is sufficient to obtain the proper corelation of parts as described, it is moved slightly laterally so as to be held in such position by the retaining means 29; and when it is desired to remove the casing from the device all that is necessary is to move the foot lever 24 away from the retaining means and remove the foot therefrom whereby the device will automatically assume the position of Figs. 2 and 3 and the tire may easily be removed.

Due to the individual features described, as well as to their corelation, a casing of any size, whether of balloon or of high pressure type, may be placed on the machine and inspected, or treated, or a tube may be placed therewithin, and the casing or tire may be removed from the machine, all with great speed and with little effort by the operator; and for inspection purposes the slightest defects are made easily apparent. Loose cords, stone bruises, rust bruises, blow outs, cuts, nails, tacks, and tack holes become apparent at once even though the tack be hidden within the material of the tire, for such tack will be caused to project well above the inner surface due to the shape of the roller 13 and the shape into which it forces the casing by its co-action with the disks 35, 36. My improved machine is economic in construction and may be operated easily at great speed, the heaviest work connected therewith being in moving the casing on and off of the machine.

Having described my invention, what I desire to secure by Letters Patent of the United States is:

1. In a machine of the class described, a roller, rotatably mounted substantially parallel disks, means to move said roller towards said disks, means to separate said disks, and a means to operate said moving means and said separating means whereby a tire casing will be gripped and flattened between said roller and said disks.

2. In a machine of the class described, a single roller, two rotatably mounted substantially parallel disks, means to move said roller towards said disks, means to separate said disks, and a means to operate said moving means and said separating means whereby a tire casing will be gripped and flattened between said roller and said disks.

3. In a machine of the class described, a roller having a central bulge, rotatably mounted substantially parallel disks, means to move said roller towards said disks, means to separate said disks, and a means to operate said moving means and said separating means whereby a tire casing will be gripped and flattened between said roller and said disks.

4. In a machine of the class described, a single roller having a central bulge, two rotatably mounted substantially parallel disks, means to move said roller towards said disks, means to separate said disks, and a means to operate said moving means and said separating means whereby a tire casing will be gripped and flattened between said roller and said disks.

5. In a machine of the class described, a roller, rotatably mounted substantially parallel disks, means to move said roller towards said disks, means to separate said disks, a means to operate said moving means and said separating means whereby a tire casing will be gripped and flattened between said roller and said disks, and means for rotating said roller whereby the casing and disks will be rotated and the tire progressively flattened.

6. In a machine of the class described, a single roller, two rotatably mounted substantially parallel disks, means to move said roller towards said disks, means to separate said disks, a means to operate said moving means and said separating means whereby a tire casing will be gripped and flattened between said roller and said disks, and means for rotating said roller whereby the casing and disks will be rotated and the tire progressively flattened.

7. In a machine of the class described, a roller having a central bulge, rotatably mounted substantially parallel disks, means to move said roller towards said disks, means to separate said disks, a means to operate said moving means and said separating means whereby a tire casing will be gripped and flattened between said roller and said disks, and means for rotating said roller whereby the casing and disks will be rotated and the tire progressively flattened.

8. In a machine of the class described, a single roller having a central bulge, two rotatably mounted substantially parallel disks, means to move said roller towards said disks, means to separate said disks, a means to operate said moving means and said separating means whereby a tire casing will be gripped and flattened between said roller and said disks, and means for rotating said roller whereby the casing and disks will be rotated and the tire progressively flattened.

9. A machine of the class described comprising a support, a foot lever on said support, arms pivotally mounted on said support, a connection between one end of said arms and said foot lever, a roller rotatably supported by the other ends of said arms, said roller being symmetrical with respect to its axis and having a central bulge and a non-slip surface, shafts mounted on said support, said shafts being opposite each other and mounted for longitudinal and rotational movement, a disk fast on the inner end of each said shaft, and a flexible draft means connected to the ends of said shafts and connected to said foot lever whereby downward movement of said foot lever will cause upward movement of said roller and spreading of said disks.

10. A machine of the class described comprising a support, a foot lever on said support, arms pivotally mounted on said support, a connection between one end of said arms and said foot lever, a roller rotatably supported by the other ends of said arms, said roller being symmetrical with respect to its axis and having a central bulge and a non-slip surface, shafts mounted on said support, said shafts being opposite each other and mounted for longitudinal and rotational movement, a disk fast on the inner end of each said shaft, a flexible draft means connected to the ends of said shafts and connected to said foot lever whereby downward movement of said foot lever will cause upward movement of said roller and spreading of said disks, and means to rotate said roller whereby said disks and tire casing grasped between said roller and said disks will be rotated.

11. A machine for continuously rotating and progressively opening a tire casing, comprising a roller and rotatably mounted substantially parallel disks cooperating therewith to grip the casing between them and to open the casing continuously and progressively as it is rotated, no part of said machine passing across the central plane of the casing within the periphery of the casing, whereby a tire tube may be progressively and continuously inserted into the casing at the opened part thereof as the casing is rotated and opened.

12. A machine for continuously rotating and progressively opening a tire casing, comprising a roller and rotatably mounted substantially parallel separable disks over said roller and cooperating therewith to grip the casing between them and to open the casing continuously and progressively as it is rotated, no part of said machine passing across the central plane of the casing within the periphery of the casing, whereby a tire tube may be progressively and continuously inserted into the casing at the opened part thereof as the casing is rotated and opened.

13. A machine for continuously rotating and progressively opening a tire casing, comprising a single roller having a central bulge and two rotatably mounted substantially parallel separable disks cooperating therewith to grip the casing between them and to open the casing continuously and progressively as it is rotated, no part of said machine passing across the central plane of the casing within the periphery of the casing, whereby a tire tube may be progressively and continuously inserted into the casing at the opened part thereof as the casing is rotated and opened.

DEWITT T. BLACKMON.